UNITED STATES PATENT OFFICE.

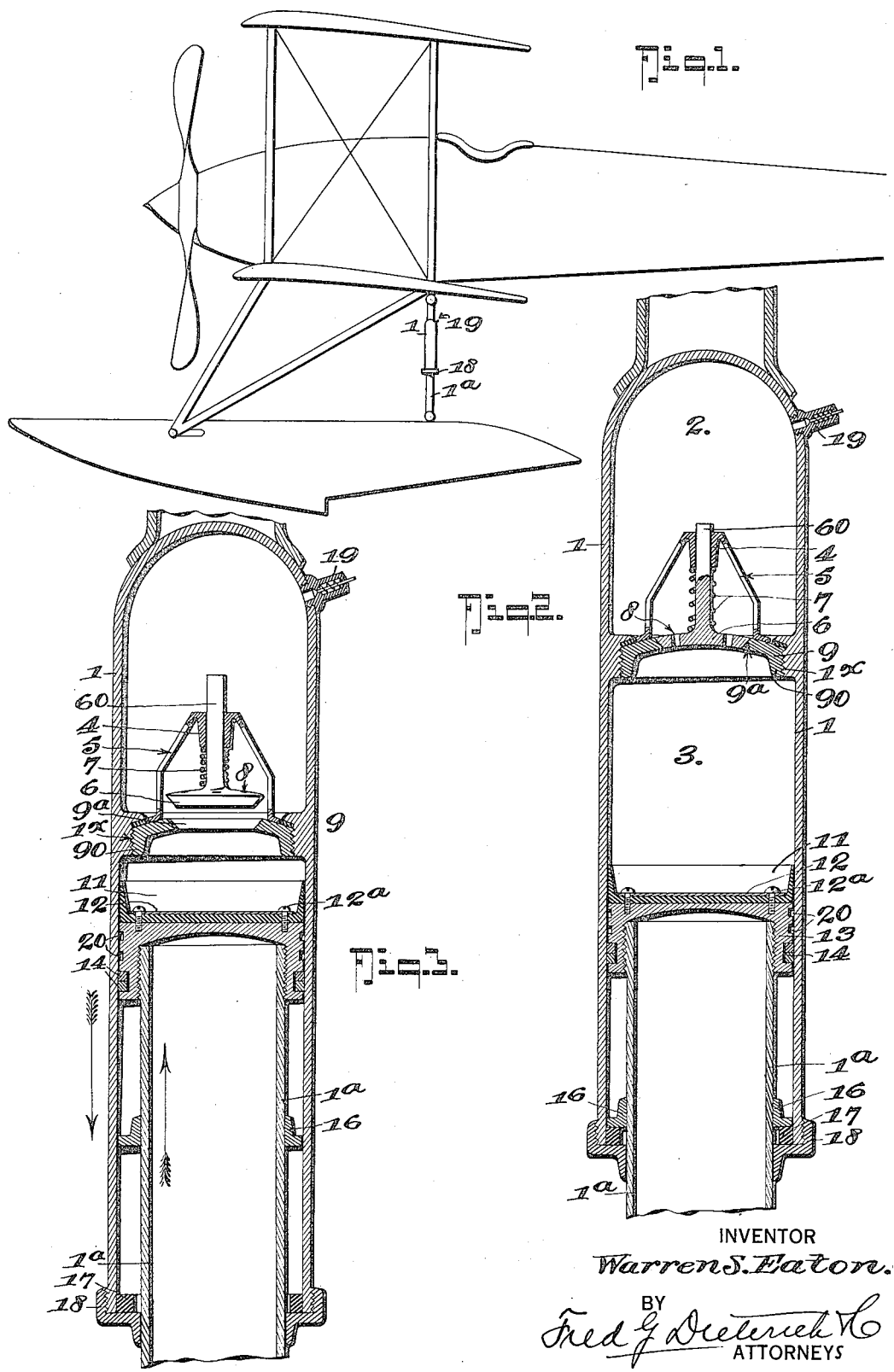

WARREN S. EATON, OF PLAINFIELD, NEW JERSEY.

PNEUMATIC SHOCK-ABSORBER.

1,289,132.

Specification of Letters Patent.  Patented Dec. 31, 1918.

Application filed July 21, 1917. Serial No. 182,061.

*To all whom it may concern:*

Be it known that I, WARREN S. EATON, a citizen of the United States, residing at Plainfield, in the county of Union and State of New Jersey, have invented a new and Improved Pneumatic Shock-Absorber, of which the following is a specification.

My invention which in its generic nature has reference to improvements in pneumatic shock absorbers in which provision is made for cushioning both strokes of the plunger or piston head, more particularly seeks to provide a simple inexpensive and efficient shock absorber in which the air holder is primarily charged or pumped up and recharged from time to time as conditions may require.

One of the objects of my invention is to provide a jar cushioning means of the character stated, while adapted for any uses for which such devices are generally employed, is particularly well adapted for use in connection with the struts or uprights in aeroplane structures for absorbing the shocks incident in making landings, &c., especially the rebound shocks.

With further objects in view that will hereinafter appear, my invention is an improved pneumatic shock absorber that embodies the peculiar features of construction and novel arrangement of parts set out in the following description, specifically pointed out in the appended claim and illustrated in the accompanying drawings, in which:

Figure 1 is a diagrammatic side elevation of a hydroaeroplane and indicates a practical application of my invention.

Fig. 2 is a vertical section of my improved shock absorber, the parts being in a normal position with the air in the primary and secondary air chambers held balanced through the small air passages in the main valve, and Fig. 3 is a similar view of the parts showing their position when in the act of absorbing a shock.

In the practical embodiment of my invention, I provide a cylinder of suitable size, one end of which is open and the other end preferably formed with a dome-shaped closure, in practice, secured by riveting, brazing or otherwise to a supporting member 1 which may be a tubular brace or standard for a hydro-aeroplane structure, as indicated in Fig. 1, the portion $1^a$ of which forms a part of the compression means hereinafter specifically referred to.

Cylinder 1 is formed with a primary air chamber 3 and a secondary air chamber 2, the latter being equipped with an ordinary type of tube filler valve 19 through which the air chambers of the cylinders are charged with air to a desired pressure and through which air in the cylinder may be readily drawn off.

The primary and secondary cylinders are formed by a division plate 9 provided with an annular external rim flange 90 that threads into an internal threaded rim flange $1^x$ formed or otherwise made fast on the inner face of the cylinder 1, as is clearly shown in Fig. 2, by reference to which it will be also seen that the plate 9 has a central valve seat of a relatively large diameter for receiving a valve 6 that is quick acting to its open position and which is normally held closed onto the seat $9^a$ by a coil spring 7 that is located around the valve stem 60 and seats against a valve guide 4 mounted on the division plate 9 and formed with elongated openings 5—5 for the passage of the air therethrough.

At this point, it should be stated, under normal condition, the pressure of the spring 7 is just sufficient to hold the valve 6 closed down on its seat, since the air pressure in the two chambers, under ordinary conditions, is uniformly distributed by reason of the two chambers being in constant communication through small ports 8 in the valve 6, as shown.

The lower end of the cylinder is externally threaded for receiving a retaining ring nut 18 which encircles the relatively stationary tubular supporting member $1^a$ upon which is mounted a stop or limit ring 16 that limits the up thrust of the cylinder as it rebounds to its normal position, a packing ring 17 being located on the retaining nut for taking up rebound shocks.

A piston 13 is secured on the upper end of the member $1^a$ and the said piston includes packing rings 14—14, lubricant holding grooves 20—20 and a cup-shaped packing washer 11 that is held on the top or outer end of the piston by a metal disk 12 secured to the piston by screws $12^a$, as shown.

The parts constituting my construction of shock absorber being at rest, as indicated in Fig. 2, and the cylinder 1 having received the charge of air up to a desired pressure, through the charging valve 19, any jar or shock on the relatively stationary part 1ª of the supporting member causes the cylinder to move down along the said supporting member or portion 1ª and which movement is cushioned by the air in the cylinder, the compressed air in the primary cylinder lifting the valve 6, now flows quickly, according to the extent of the shock, into the secondary or upper cylinder 2, it being understood that upon the rebound of the cylinder 1, the air above the valve 6 instantly closes the said valve and the rebound action is gradually retarded by the slow recharge of the air into the primary cylinder through the small air ports 8 in the valve 6, and as the rebound is thus also cushioned, a smooth and even restoring of the movable parts of the absorber is provided for.

Under certain conditions, if desired, the air in the chambers 2 and 3 may be normally at atmospheric pressure or any other pressure desired.

From the foregoing description taken in connection with the drawing, the complete arrangement, the manner of operation and the advantages of my invention will be readily apparent to those skilled in the art to which it appertains.

What I claim is:

In a pneumatic shock absorber, a relatively stationary closed piston and a relatively movable cylinder in which the piston operates, said cylinder having a diaphragm above the piston dividing the cylinder into an upper and a lower air chamber, a valve seat member secured to said diaphragm, a quick-acting valve coöperating with said seat member and adapted to open into the chamber farthest from the piston, said valve member having slot return air passages whereby the air from the chamber farthest from the piston may be slowly returned to the chamber adjacent to the piston after the valve is seated, a one-way chamber valve mounted on the cylinder and in communication with the chamber farthest from the piston through which air can be automatically drawn into said last-named chamber, a piston rod connected to said piston, a cap on the end of said cylinder having an aperture through which the piston rod passes, a stop ring on said piston rod within the cylinder and a rebound shock absorbing packing ring located within the cylinder and surrounding the piston rod and lying between said cap and said stop member.

WARREN S. EATON.